(12) United States Patent
Louis et al.

(10) Patent No.: US 7,528,512 B2
(45) Date of Patent: May 5, 2009

(54) TWO-OUTLET ELECTROMECHANICAL MOTOR

(75) Inventors: Charles Louis, Aix en Provence (FR); Jean Mondet, Pelissanne (FR); Patrick Quesne, Ecouflant (FR)

(73) Assignees: Eurocopter, Marignane (FR); Artus, Avrille (FR)

( * ) Notice: Subject to any disclaimer, the term of this patent is extended or adjusted under 35 U.S.C. 154(b) by 509 days.

(21) Appl. No.: 11/259,089

(22) Filed: Oct. 27, 2005

(65) Prior Publication Data

US 2006/0088417 A1    Apr. 27, 2006

(30) Foreign Application Priority Data

Oct. 27, 2004 (FR) .................................. 04 11464

(51) Int. Cl.
*H02K 7/02* (2006.01)

(52) U.S. Cl. ............................ 310/77; 310/93; 310/115; 310/123

(58) Field of Classification Search ................. 310/114, 310/115, 123, 76, 77, 92, 93
See application file for complete search history.

(56) References Cited

U.S. PATENT DOCUMENTS 2,462,182 A * 2/1949 Guerdan et al. ............. 310/115
6,005,358 A * 12/1999 Radev ........................ 318/139

FOREIGN PATENT DOCUMENTS

| DE | 100 10 962 | 9/2001 |
|---|---|---|
| EP | 0 469 263 | 5/1991 |
| FR | 1254455 | 1/1960 |
| WO | WO 89/04081 | 5/1989 |

\* cited by examiner

*Primary Examiner*—Dang D Le
(74) *Attorney, Agent, or Firm*—Young & Thompson

(57) ABSTRACT

The present invention relates to an electromechanical motor (M) provided with an actuator (A) having an outer casing (30-30'-30") surrounding a stator (20-20') possessing a coil (24). The rotor (10) is also disposed inside the stator (20-20'). The invention is remarkable in that the actuator has two distinct and independent outlets (S1, S2) capable respectively of actuating, one after the other, first and second transmissions (C1, C2).

13 Claims, 2 Drawing Sheets

TWO-OUTLET ELECTROMECHANICAL MOTOR

The present invention relates to a two-outlet electromechanical motor, the outlets triggering two different mechanisms, one after the other.

In addition, the motor is advantageously used in an automatic device for folding/deploying a blade of a main lift and propulsion rotor of a rotorcraft. Once the blades have been folded along the fuselage of the rotorcraft, the rotorcraft occupies a greatly reduced amount of space thus making it easier to store in a hangar, e.g. on board a ship.

BACKGROUND OF THE INVENTION

When the rotorcraft is in the flight configuration, its blades are connected to the hub of the main rotor via fastener means that lock them in a deployed position.

In order to fold a blade, it is then necessary to unlock the blade so as to allow it to move through a large amplitude, generally towards the rear.

To deploy a blade, it suffices to perform the above-specified sequence in reverse order. The blade is returned to the flight configuration by moving through a large amplitude, generally towards the front, and it is then locked in the deployed position.

A first device for folding/deploying a blade is known that makes use of two single-outlet motors respectively for performing the locking function and for performing the folding function via first and second transmissions of movement. Each single-outlet motor comprises an outer casing surrounding a stationary stator provided with a coil, and having a rotor located therein. On being powered electrically, the stator creates magnetic field that causes the rotor to rotate, which can then drive the transmission to which it is connected.

That solution is effective, but bulky and difficult to implement.

A second device is known for folding/deploying a blade, referred to as an "interlock" device, that uses a single motor having a single outlet that controls both the locking/unlocking mechanism and the folding/deploying mechanism. Depending on the position of the fastener means, and acting via "mechanical" logic linked to the transmissions, either the locking/unlocking mechanism or the folding/deploying mechanism is driven. Although apparently advantageous, that second device is very difficult to develop and its weight is high, given the large number of mechanical parts.

As mentioned above, known devices require two different transmissions to be driven, in order to fold/deploy the blades of the main rotor of a rotorcraft, for example, making use of one or two motors each having a single outlet. Under such conditions, in order to avoid the above-mentioned limitations associated with those prior art devices, it is appropriate to make use of a new kind of motor, referred to below as a two-outlet motor, for actuating the two transmissions of movement.

OBJECTS OF THE INVENTION

An object of the present invention is thus to propose a two-outlet electromechanical motor enabling two different mechanisms to be triggered one after the other.

According to the invention, an electromechanical motor is provided with an actuator provided with an outer casing surrounding a stator that possesses a coil. In addition, a rotor is arranged inside the stator. The invention is remarkable in that the actuator has two distinct and independent outlets, capable respectively of driving first and second transmissions, one after the other.

To actuate the second transmission, the stator is free to rotate about an axis while the rotor is braked.

Similarly, in order to actuate the first transmission, the rotor is free to rotate about said axis while the stator is braked, in turn.

For this purpose, and since it is powered electrically by processor means, optionally integrated in the motor and arranged against the outer casing of the actuator, the stator creates a magnetic field by means of its coil. When the stator is held in a fixed position, then the rotor begins to rotate under the action of the magnetic field. Otherwise, and by reaction, when it is the rotor that is held in a fixed position, then it is the stator that is driven in rotation.

Thus, this electromechanical motor possesses two distinct outlets and is capable of driving two distinct transmissions one after the other, the first transmission being driven by the rotor when it turns and the second transmission being driven by the stator.

Advantageously, the rotor has a first disk. The first disk is pressed against a main braking means by a first secondary braking means, thus preventing the rotor from turning.

Similarly, a second disk arranged on the stator is held against the main braking means by a second secondary braking means, thus preventing the stator from turning.

With the rotor and the stator being braked by the main and secondary braking means, the electromechanical motor of the invention includes disconnector means making it possible to allow the rotor or the stator to begin turning.

Consequently, first disconnector means, e.g. at least one electromagnet, serve, on being powered electrically by the processor means, to separate the first secondary braking means from the first disk. Since the second disk continues to be clamped between the main braking means and the second secondary braking means, the stator is held fixed while the rotor can be set into rotation by the magnetic field created by the stator.

Similarly, second disconnector means, e.g. at least one electromagnet, serve, on being powered electrically by the processor means, to enable the second secondary braking means to be separated from the second disk.

Finally, in order to enable the processor means to power the stator electrically in all configurations, i.e. regardless of whether the stator is turning or not, at least one slip ring is disposed between the outer casing and the stator.

In addition, the present invention also provides an automatic device for folding/deploying a blade making use of the above-described two-outlet electromechanical motor so as to optimize the compactness, the positioning, the adjustment, and the weight of the device.

Although extremely useful in an automatic device for folding/deploying blades, the two-outlet motor can be arranged in any system that requires two different mechanisms to be actuated, e.g. in a retractable undercarriage.

According to the invention, a device for automatically folding/deploying a blade of a main rotor of a rotorcraft is provided with at least one locking means and with at least one folding means respectively under the control of first and second transmissions.

The device is remarkable in that the first and second transmissions are actuated independently and one after the other by a single two-outlet electromechanical motor of the invention.

Using a single motor and two relatively simple transmissions makes it possible to obtain a device that is compact, reliable, and easy to be adjusted.

In addition, since the two transmissions are independent of each other, any mechanical problem that might interfere with the operation of one or the other of the transmissions will not prevent the other transmission from operating properly. This ensures that maintenance operations are greatly facilitated.

In addition, the device of the invention advantageously includes first and second monitor means for informing the processor means of the motor about the positions of the locking means and of the folding means respectively. Depending on the information delivered by said first and second monitor means, the processor means optionally control the electromechanical motor to actuate the first or the second transmission.

An operator, e.g. the pilot of the rotorcraft, may also instruct folding/deployment by using control means for sending a folding or a deployment instruction to the processor means.

Finally, in order to accommodate a problem arising during the folding/deployment operation, at least one torque limiter is included in each of the transmissions.

BRIEF DESCRIPTION OF THE DRAWINGS

The invention and its advantages appear in greater detail from the following description of an embodiment given without any limiting character and with reference to the accompanying figures, in which.

MORE DETAILED DESCRIPTION

Elements that are present in more than one of the figures are given the same references in each of them.

Figure 1:
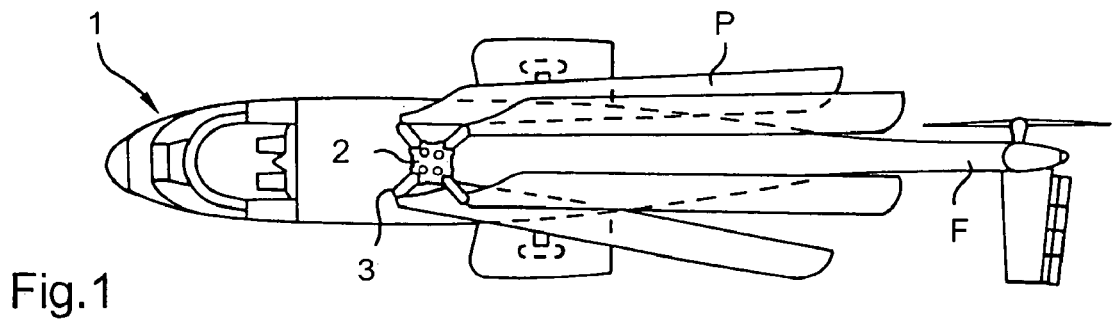
FIG. 1 is a plan view of a rotorcraft.

FIG. 1 is a plan view of a rotorcraft 1. It has four blades P, each blade P being connected to the hub 2 of the main rotor of the rotorcraft via an arm 3.

In order to make it possible to house the rotorcraft 1 in a hangar of small size, e.g. on board a ship, the blades P are folded rearwards so as to extend along the tail boom F.

Figure 2:
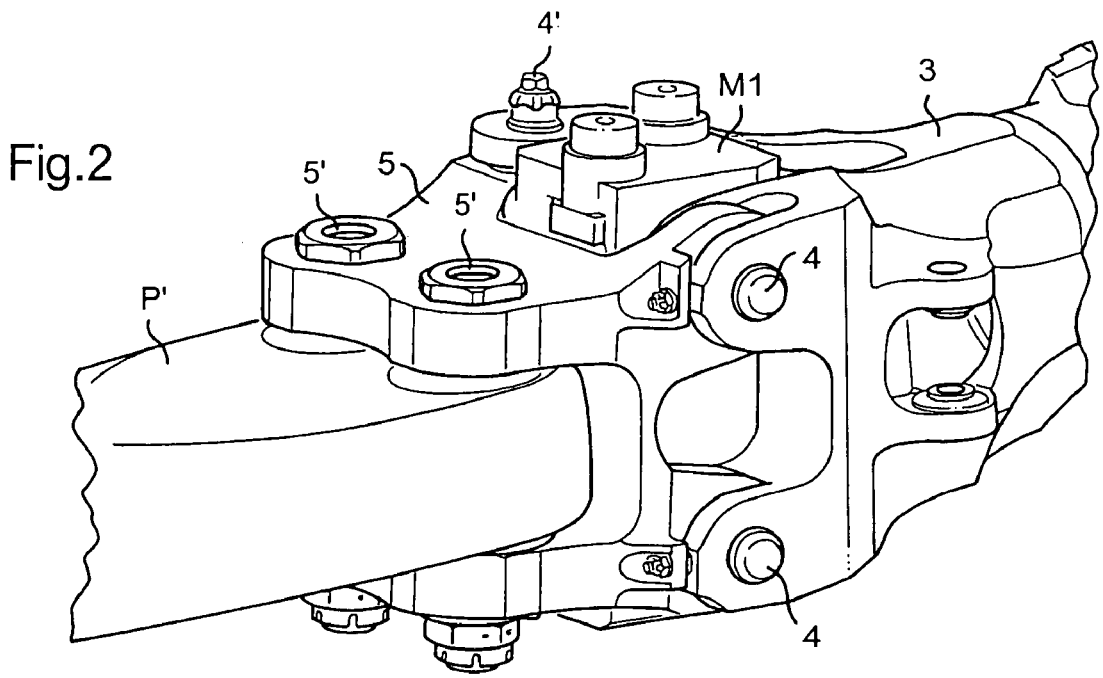
FIG. 2 is a view of blade-locking means.

FIG. 2 shows means for locking a blade P. The root P' of the blade P is attached to a fitting 5 by conventional fastener means, e.g. bolts 5'.

In addition, the fitting 5 is secured to the arm 3 by pins 4' and by locking means M1 having two retractable bolts 4.

By unlocking the pair of bolts 4, the blade P is released, thus enabling the folding means M2 (not shown in FIG. 2) to position the blade P, by causing it to pivot about the pins 4' along the tail boom F.

Figure 3:
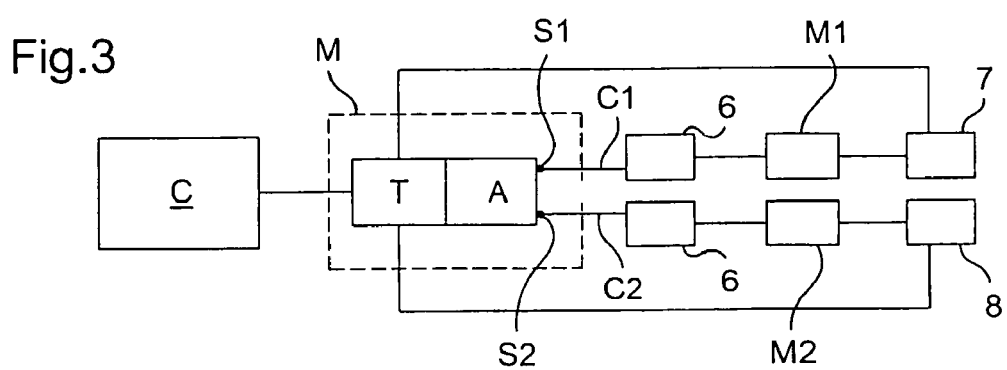
FIG. 3 is a block diagram of a blade folding/deploying device of the invention.

FIG. 3 shows an automatic device of the invention for folding/deploying a blade of the main rotor of a rotorcraft.

The device comprises control means C for locking/unlocking a rotorcraft blade, an electromechanical motor M provided with processor means T and with an actuator A having two outlets S1 and S2, first and second transmissions C1 and C2, locking means M1, folding means M2, and first and second monitor means 7 and 8.

The actuator A of the electromechanical motor M is electrically powered with three-phase electricity by the processor means T. It operates like an electric motor of the asynchronous type. In addition, the two outlets S1 and S2 of the actuator A can turn clockwise or counterclockwise, with the direction of rotation depending on the manner in which the phases are powered electrically. Under such conditions, it is clear that the direction of rotation of each of the outlets S1, S2 differs depending on whether a blade is being folded or deployed. Thus, if the actuator A is electrically powered so that its outlets S1 and S2 turn counterclockwise during the folding operation, it needs to be fed electrically so that its outlets S1 and S2 turn clockwise during the deployment operation.

In order to fold a blade on the ground or on any other helipad, i.e. in order to go from a flight configuration to a parking configuration, an operator uses the control means C to begin the folding sequence constituted by an initial unlocking cycle and a subsequent folding cycle.

At the being of the unlocking cycle, the processor means T power the actuator A electrically so as to drive the locking means M1 via the first transmission C1 connected to the first outlet S1 of the actuator A.

The locking means M1 enable the bolts 4 to disengage the assembly constituted by the arm 3 and the blade P, thereby releasing the blade P and allowing it to move rearwards.

Thereafter, the first monitor means 7, e.g. an end-of-stroke microswitch, inform the processor means T that the blade is unlocked, thereby ending the first cycle.

It is then possible to begin folding the blade P. The processor means T power the actuator A electrically in such a manner as to start driving the folding means M2 via the second transmission C2 connected to the second outlet S2 of the actuator A.

The folding means M2 then act on the blade P to stow it along the tail boom F of the rotorcraft. Once the blade P is in place, the second monitor means 8, e.g. an end-of-stroke microswitch, deliver a signal to the processor means T informing it that the blade is properly positioned. The actuator A is then no longer powered electrically, and the operation has terminated.

A blade P is deployed in application of the same principle. Nevertheless, as mentioned above, the direction of rotation of the outlets S1, S2 of the actuator A is opposite to that used during the folding operation.

Thus, the processor means T power the actuator A electrically in such a manner as to drive the folding means M2 via the second transmission C2 connected to the second outlet S2 of the actuator A.

The folding means M2 then act on the blade P to return it to the flight configuration. Once the blade P is in position, the second monitor means 8 send a signal to the processor means T to inform it that the blade P is properly positioned.

Thereafter, the processor means T power the actuator A electrically so as to drive the locking means M1 via the first transmission C1 connected to the first outlet S1 of the actuator A.

The locking means M1 enable the bolts 4 to fasten the blade P securely to the arm 3.

The first monitor means 7 then inform the processor means 6 that the blade is locked.

Finally, each of the transmissions advantageously includes a torque limiter 6 serving to prevent the transmissions C1, C2 braking in the event of an element external to the device impeding the folding/deployment operations.

Figure 4:
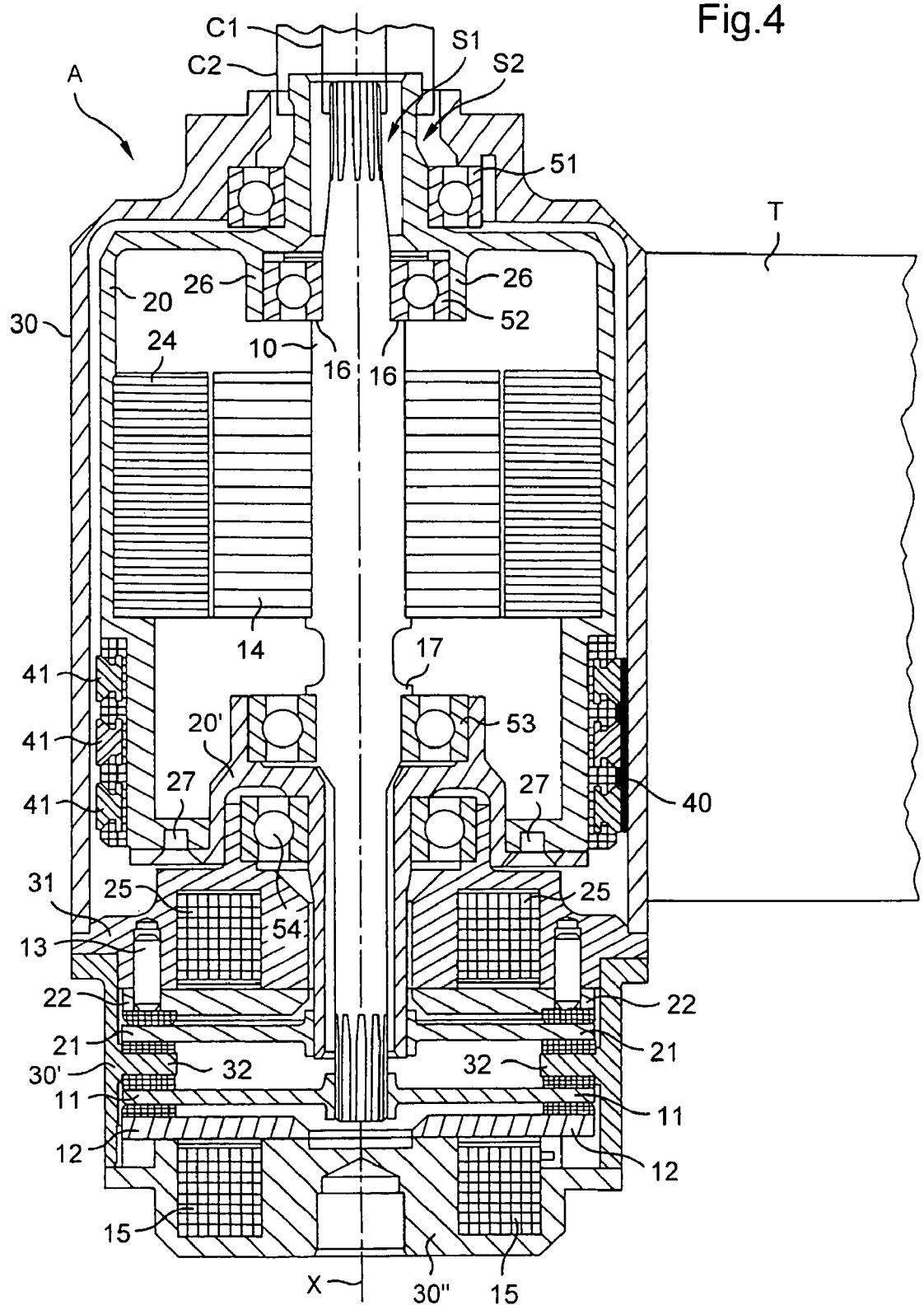
FIG. 4 is a section of a two-outlet electromechanical motor of the invention.

FIG. 4 shows an electromechanical motor M of the invention provided with an actuator A having two outlets S1, S2, and processor means T.

The actuator A comprises a stator having a bottom portion 20' and a top portion 20 provided with a first coil 24, a rotor 10 provided with a second coil 14 of the squirrel cage type, and an outer casing provided with a main portion 30, an intermediate portion 30', and a cover 30". In addition, the rotor 10 and the stator are circularly symmetrical about the axis X.

The top portion 20 of the stator is arranged inside the main portion 30 of the outer casing, a first ball bearing 51 being placed between these two portions 20 and 30. Similarly, the rotor 10 is inserted inside the stator, a second ball bearing 52 being disposed between first and second shoulders 16 and 26 relating respectively to the rotor 10 and to the top portion 20 of the stator.

A third ball bearing 53 has its inner ring coming into abutment against a projection 17 on the rotor 10. It is also in contact via its outer ring with the bottom portion 20' of the stator, which bottom portion is fastened to the top portion 20 via conventional means, e.g. screws 27.

The rotor 10, thus held by the second and third ball bearings 52 and 53 and by the stator is therefore constrained to perform only rotary movements about the axis X.

Similarly, the stator is held by a fourth ball bearing 54 arranged against its bottom portion 20' and a spacer 31, which spacer is itself secured to the outer casing by being clamped by conventional fastener means (not shown) between the main portion 30 thereof and the intermediate portion 30' thereof. Thus, the stator is likewise constrained to perform rotary movements only about the axis X.

When the rotor 10 turns about the axis X, the first outlet S1 of the actuator A serves to drive a first transmission C1. Similarly, when the stator turns, the second outlet S2 of the actuator A drives a second transmission C2.

In FIG. 4, both transmissions C1 and C2 are disposed about the axis X. However, it is clear that the outlets S1 and S2 can be adapted to allow connections to be made with the transmissions C1, C2 about an axis that is at an angle relative to the axis X, for example that could be perpendicular thereto.

Furthermore, the processor means T power the stator electrically with three-phase electricity via slip rings 41 in contact with brushes 40, e.g. made of graphite, and arranged in the top portion 30 of the outer casing. Electricity then flows into the first coil 24 which creates a magnetic field inside the actuator A.

If the stator is braked, by means described below, then the magnetic field rotates the rotor 10 so as to drive the first transmission C1. Conversely, if it is the rotor 10 that is braked, then the stator itself begins to rotate.

The internal braking system is disposed in the bottom zone of the actuator A, i.e. inside the intermediate portion 30' and the cover 30".

In addition, the rotor 10 and the stator are provided with respective first and second disks 11 and 21. By clamping one or the other of the disks 11 and 21 between main braking means 32 and respective secondary braking means 12 and 22, any rotary movement of the rotor or the stator can be prevented, as described.

To do this, the following elements are arranged one above another:
the spacer 31;
the second secondary braking means 22.
the second disk 21;
the main braking means 32 secured to the outer casing since it is constituted by a shoulder on the intermediate portion 30';
the first disk 11;
the first secondary braking means 12; and
the cover 30".

In addition, the first and second secondary braking means 12 and 22 are constrained to turn with the outer casing by being connected respectively to the spacer 31 and to the cover 30" by conventional means. Since the outer casing is fixed, the first and second secondary braking means 12 and 22 cannot turn. However, conventional means, e.g. pegs 13 for the second secondary means, nevertheless allow the first and second secondary braking means 12 and 22 to move a short distance along the axis X.

Springs (not shown in FIG. 4) are also inserted in the spacer 31 and the cover 30". Thus, when the actuator A is not powered electrically, these springs urge the first and second secondary braking means 12 and 22 respectively against the first and second disks 11 and 21. The disks are thus jammed between the main braking means 32 and the secondary braking means 12 and 22. In this state, neither the rotor 10 nor the stator can turn about the axis X.

In order to enable the motor M to perform its function, i.e. drive first and second transmissions C1 and C2 one after the other, the actuator A includes first and second disconnector means 15 and 25 which are controlled by the processor means T in accordance with requirements.

The first and second disconnector means 15 and 25 comprise electromagnets disposed respectively in the cover 30" and the spacer 31.

Consequently, using the processor means T, the electromechanical motor M serves either to drive the first transmission C1 via the first outlet S1 under drive from the rotor, or the second transmission C2 via the second outlet S2 under drive from the stator. At rest, i.e. when the processor means T are not delivering electrical power to the actuator A, neither of the outlets is ready to be driven. The internal braking system is always active, so that both outlets S1 and S2 at rest are blocked, whereas in operation the outlets are blocked one after the other, and consequently only one of them is blocked at a time.

The motor M and its two outlets S1 and S2 as used by way of example in the above-described device for folding a blade, thus operate as follows.

At the beginning of operation, the actuator A is not powered electrically, with the rotor and the stator thus being blocked by the braking system.

The processor means T then power the first disconnector means 15 electrically, e.g. using direct current (DC). The electromagnet then behaves like a magnet so that the first secondary braking means 12 are attracted to the first disconnection means 15, thereby releasing any constraints on the first disk 11.

Thereafter, the processor means T power the first coil 24 of the stator electrically, via the slip rings 41 and the graphite brushes 40, thereby generating a magnetic field. Since the disk 11 is released, the rotor is set into rotation by the magnetic field and actuates the first transmission C1 to unlock the blade. Once the bolts 4 have been retracted, the monitor means 7 inform the processor means T that the unlocking operation has terminated.

Once this first cycle has been brought to an end, the processor means T no longer feed electricity to the actuator A, and more particularly no longer power the first disconnector means 15. Under the effect of the springs, the first secondary braking means 12 return to its original position, so the rotor is again braked.

Nevertheless, the processor means T then power the second disconnector means 25 electrically, e.g. with DC. The second secondary braking means 22 consequently move towards the second disconnector means 25, thereby releasing the second disk 21.

As during the first cycle, the processor means T also power the first coil 24 of the stator, thereby generating a magnetic field. Since the disk 21 is no longer braked, the stator is set into rotation, thereby enabling the second transmission C2 to fold the blade P.

Naturally, the present invention can be subjected to numerous variations as to its implementation. Although one embodiment is described above, it will readily be understood that it is not conceivable to identify exhaustively all possible embodiments. It is naturally possible to envisage replacing any of the means described by equivalent means without going beyond the ambit of the present invention.

The invention claimed is:

1. An electromechanical motor (M) comprising:
    an actuator (A) having an outer casing (30-30'-30'') surrounding a stator (20-20'), with a rotor (10) being arranged therein, said actuator (A) having a first and a second outlet (S1, S2) that are distinct and separate from each other and are normally blocked, but are released, one after another, to respectively actuate a first transmission and a second transmission (C1 and C2) independently one after the other, wherein:
    said motor (M) has a single main braking means (32),
    said rotor (10) has a first disk (11) clamped between a first secondary braking means (12) and said single main braking means (32),
    said stator (20-20') has a second disk (21) clamped between a second secondary braking means (22) and said single main braking means (32).

2. The electromechanical motor according to claim 1, wherein said stator (20-20') is free to move in rotation about an axis (X) when said rotor (10) is braked, in order to drive said second transmission (C2).

3. The electromechanical motor according to claim 1, wherein said rotor (10) is free in move in rotation about an axis (X) when said rotor (20-20') is braked, in order to drive said first transmission (C1).

4. The electromechanical motor according to claim 1, wherein said actuator (A) includes a first disconnector means (15) which, on being powered electrically, separate said first secondary braking means (12) from said first disk (11).

5. The electromechanical motor according to claim 4, wherein said first disconnector means (15) comprise at least one electromagnet.

6. The electromechanical motor according to claim 1, wherein said actuator (A) includes a second disconnector means (25) which, on being powered electrically, separate said second secondary braking means (22) from said second disk (21).

7. The electromechanical motor according to claim 6, wherein said second disconnector means (25) comprise at least one electromagnet.

8. The electromechanical motor according to claim 1, wherein said stator (20-20') is powered electrically by at least one slip ring (41) arranged between said outer casing (30) and said stator (20-20').

9. The electromechanical motor according to claim 1, wherein said actuator (A) is electrically powered by a processor means (T).

10. The electromechanical motor according to claim 9, wherein said processor means (T) are integrated in said motor (M) being arranged against the outer casing (30) of said actuator (A).

11. The electromechanical motor according to claim 1, wherein said first disk is arranged on said rotor (10) and adapted to be pressed against said single main braking means by said first secondary braking means to prevent said rotor from turning thereby blocking said actuation of said first transmission.

12. The electromechanical motor according to claim 1, wherein said second disk is arranged on said stator (20-20') and is adapted to be held against said single main breaking means by said second secondary braking means to prevent said stator from turning thereby blocking said actuation of said second transmission.

13. The electromechanical motor according to claim 1, further comprising springs that, when the actuator is not electrically powered, push the first and second secondary braking means respectively against the first and second disks, whereby the first and second disks are jammed between the single main braking means and the first and second secondary braking means so that neither the rotor nor the stator can turn about an axis X.

* * * * *